Patented June 27, 1939

2,163,901

UNITED STATES PATENT OFFICE 2,163,901

PHOSPHORUS PENTOXIDE DRIER

Walter O. Walker and William R. Rinelli, Marinette, Wis., assignors to Ansul Chemical Company, Marinette, Wis., a corporation of Wisconsin No Drawing. Application August 25, 1938, Serial No. 226,838

9 Claims. (Cl. 252—2.5)

This invention relates to the use of phosphorus pentoxide as a drier for gases and liquids. More specifically the invention relates to the use of phosphorus pentoxide in a form suitable for use as a dehydrating agent in a refrigerating system without gumming or clogging the system.

Considerable difficulty has been encountered in the operation of refrigerating systems, when more than a few thousandths of one per cent by weight of moisture is present in the refrigerant. This holds true for all refrigerants commonly used, such as sulphur dioxide, methyl chloride, methylene chloride (Carrene), "Freon 12" (dichlorodifluoromethane), "Freon 11" (trichlorodifluoromethane), "Freon 114" (dichlorotetrafluoroethane), etc. Excess moisture in these refrigerants is highly undesirable because it causes corrosion and/or clogging of the refrigerating system. It is well known that moisture in sufficient amounts in sulphur dioxide produces corrosion. Also moisture in the other mentioned refrigerants produces, when present in sufficient quantities, corrosion and/or ice crystal formation which may clog the valves of the refrigerating machine.

For this reason considerable care is exercised by machine manufacturers, producers of refrigerants and refrigerating oils, and service men to have the moisture content of the finished refrigerating systems low enough to eliminate the possibility of harmful effects due to moisture.

In spite of the care exercised, moisture may and does get into a refrigerating system. In order to remove this undesirable moisture without disturbing the operation of the machine, various means have been proposed and used, among which is the use of a class of substances known in the trade as driers. Chief among these driers are activated alumina ($Al_2O_3$), silica gel ($SiO_2$), Drierite ($CaSO_4$), calcium chloride ($CaCl_2$), calcium oxide (CaO) and barium oxide (BaO). All of these substances possess the property of removing moisture from refrigerants to an extent characteristic of each individual drier. They are commonly used in cartridges, provided with suitable connections, which are placed in either of the suction or liquid lines of the refrigerating system, where they are allowed to remain until the moisture content of the system has been lowered sufficiently to permit operation free from the harmful effects produced by excessively high moisture.

Phosphorus pentoxide, although recognized as a most excellent drier, has hitherto not been successfully used in refrigerating systems due to the fine, powdery physical state in which it is marketed. This physical condition of the phosphorus pentoxide restricts the flow of liquid and/or gas through it.

In order to overcome this difficulty it has been proposed to mix the phosphorus pentoxide with some inert comminuted material such as asbestos, charcoal, glass beads, etc., thus appreciably reducing the resistance to the flow of liquids and gases. When certain such mixtures containing large amounts of $P_2O_5$ were attempted to be used in refrigerating machines, considerable difficulty was encountered because the phosphorus pentoxide formed a gummy mass or solution which clogged the system and did not permit the circulation of the refrigerant. After considerable experimentation we have discovered that this difficulty can be overcome by adjusting within predetermined limits the ratio of particle size of the comminuted material used to the maximum amount of phosphorus pentoxide mixed with same so that substantially all of the phosphorus pentoxide is superficially distributed and adhered to the surface of the comminuted inert material without having any substantial excess amounts of phosphorus pentoxide in the mixture not adhered to the surface of the comminuted material.

We have found that such definite mixtures of inert material, such as quartz grains of various sizes, with phosphorus pentoxide possess sufficiently low resistance to the flow of liquids and gases so that they may be used successfully as driers in refrigerating systems. Such mixtures have substantially all of the phosphorus pentoxide distributed over, and adhering to, the surface of the quartz grains or other inert material. The maximum quantity of phosphorus pentoxide which may be used successfully with quartz grains or other inert comminuted material of various sizes may be determined by making a series of mixtures in which the quantity of phosphorus pentoxide is increased to the point where not all of it adheres to the quartz grains after thorough mixing. We have discovered that the presence of this loose unadhered phosphorus pentoxide is highly undesirable as it increases the resistance to flow of gases and liquids and makes the use of the mixture as a drier increasingly difficult or well nigh impossible.

As a specific embodiment of our invention, the preferred ratio of particle size of quartz grains to the maximum per cent of phosphorus pentoxide by weight, is approximately as set forth in the table given below. With small quartz particles, it is difficult to establish an exact figure for the maximum amount of phosphorus pentoxide. Values vary over a range of approximately 5% depending on the nature of the surface of the quartz grains and the treatment accorded the quartz prior to, and during mixing with the phosphorus pentoxide.

TABLE

*Ratio of quartz particle size to maximum percentage of $P_2O_5$*

| Tyler standard screen size | Maximum percent by weight $P_2O_5$ |
|---|---|
| 50 | 15-20 |
| 32 | 15-20 |
| 20 | 12-15 |
| 14 | 10-12 |
| 10 | 9-10 |
| 6 | 5-7 |
| 4 | 2-3 |

A satisfactory mixture for drying refrigerants within the maximum ratios given in this table, for example, is 5% by weight of phosphorus pentoxide and 95% by weight quartz particles No. 10 mesh size, Tyler standard test screens.

In preparing our mixtures of quartz grains and phosphorus pentoxide for use as a dehydrating agent, quartz grains of a definite screen size are selected, thoroughly washed with water, air dried and mixed with the maximum or less quantity of powdered phosphorus pentoxide corresponding to the screen size as given in the foregoing table. The ingredients are thoroughly mixed so as to uniformly distribute and adhere substantially all of the phosphorus pentoxide on the surface of the quartz grains.

Mixtures of quartz grains or other inert comminuted materials and phosphorus pentoxide made in the proportions set forth above give excellent results as driers of refrigerating systems. They may be used in a fashion similar to that employed for other commonly used driers. Such mixtures are free flowing when dry and will not clog even when the maximum moisture has been absorbed. Channeling of the drier when in use is also minimized. We have also found that the refrigerant will not carry off any phosphorus pentoxide as it clings to the inert material.

We claim:

1. A dehydrating agent consisting of a pulverulent mixture of phosphorus pentoxide and quartz grains, substantially all of said phosphorus pentoxide being superficially distributed and directly adhered to the surface of the quartz grains and without having any substantial loose unadhered amounts of phosphorus pentoxide.

2. A dehydrating agent consisting of a pulverulent mixture of phosphorus pentoxide and comminuted inert material, substantially all of said phosphorus pentoxide being superficially distributed and directly adhered to the surface of the comminuted material and without having any substantial loose unadhered amounts of phosphorus pentoxide.

3. A dehydrating agent consisting of a pulverulent mixture of phosphorus pentoxide and quartz grains, the quantity of phosphorus pentoxide being in an amount just sufficient to be superficially distributed and directly adhered to the surface of the quartz grains and without having any substantial loose unadhered amounts of phosphorus pentoxide.

4. A dehydrating agent consisting of a pulverulent mixture of phosphorus pentoxide and inert comminuted material, the quantity of phosphorus pentoxide being in an amount just sufficient to be superficially distributed and directly adhered to the surface of the comminuted material and without having any substantial loose unadhered amounts of phosphorus pentoxide.

5. A dehydrating agent consisting of a pulverulent mixture of 5% by weight of phosphorus pentoxide and 95% by weight of quartz grains No. 10 mesh Tyler standard test screens, said phosphorus pentoxide being superficially distributed and directly adhered to the surface of said quartz grains and without having any substantial loose unadhered amounts of phosphorus pentoxide.

6. A dehydrating agent consisting of a pulverulent mixture of phosphorus pentoxide and quartz grains in the ratio of particle size of quartz grains to maximum per cent by weight of phosphorus pentoxide as follows:

| Particle size of quartz (Tyler standard screen size) | Maximum percent by weight $P_2O_5$ |
|---|---|
| 50 | 15-20 |
| 32 | 15-20 |
| 20 | 12-15 |
| 14 | 10-12 |
| 10 | 9-10 |
| 6 | 5-7 |
| 4 | 2-3 | substantially all of said phosphorus pentoxide being superficially distributed and directly adhered to the surface of said quartz grains and without having any substantial loose unadhered amounts of phosphorus pentoxide.

7. A method of drying fluids which comprises passing a fluid through a mixture of phosphorus pentoxide and quartz grains, substantially all of said phosphorus pentoxide being superficially distributed and directly adhered to the surface of the quartz grains and without having any substantial loose unadhered amounts of phosphorus pentoxide.

8. A method of drying fluids which comprises passing a fluid through a mixture of phosphorus pentoxide and inert comminuted material, substantially all of said phosphorus pentoxide being superficially distributed and directly adhered to the surface of the comminuted material and without having any substantial loose unadhered amounts of phosphorus pentoxide.

9. A method of drying refrigerants which comprises passing a refrigerant through a pulverulent mixture consisting of 5% by weight of phosphorus pentoxide and 95% by weight of quartz grains No. 10 mesh Tyler standard test screens, said phosphorus pentoxide being superficially distributed and directly adhered to the surface of said quartz grains and without having any substantial loose unadhered amounts of phosphorus pentoxide.

WALTER O. WALKER.
WILLIAM R. RINELLI.